(12) United States Patent
Eilersen

(10) Patent No.: US 10,451,501 B2
(45) Date of Patent: Oct. 22, 2019

(54) LOAD CELL COMPRISING AN ELASTIC BODY HAVING A BASE AND FLEXIBLE MEMBER

(71) Applicant: Niels Aage Juul Eilersen, VedBaek (DK)

(72) Inventor: Niels Aage Juul Eilersen, VedBaek (DK)

( * ) Notice: Subject to any disclaimer, the term of this patent is extended or adjusted under 35 U.S.C. 154(b) by 21 days.

(21) Appl. No.: 15/824,756

(22) Filed: Nov. 28, 2017

(65) Prior Publication Data

US 2018/0156678 A1  Jun. 7, 2018

Related U.S. Application Data

(63) Continuation of application No. PCT/DK2016/000046, filed on Dec. 1, 2016.

(51) Int. Cl.
| | |
|---|---|
| *G01L 1/26* | (2006.01) |
| *G01G 7/06* | (2006.01) |
| *G01G 21/24* | (2006.01) |
| *G01L 1/14* | (2006.01) |

(52) U.S. Cl.
CPC ............... *G01L 1/26* (2013.01); *G01G 7/06* (2013.01); *G01G 21/245* (2013.01); *G01L 1/142* (2013.01); *G01L 1/144* (2013.01)

(58) Field of Classification Search
CPC .......... G01L 1/26; G01L 1/144; G01L 1/142; G01G 7/06; G01G 21/245
USPC .................................................... 73/862.626
See application file for complete search history.

(56) References Cited

U.S. PATENT DOCUMENTS

| | | | | |
|---|---|---|---|---|
| 3,713,333 | A | | 1/1973 | Mac George |
| 4,165,402 | A | | 8/1979 | Dubs et al. |
| 5,209,121 | A | | 5/1993 | Hafner |
| 5,336,854 | A | * | 8/1994 | Johnson ............... G01G 3/1412 177/210 FP |
| 7,024,948 | B2 | * | 4/2006 | Eilersen .................... G01G 3/12 73/862.627 |
| 7,475,606 | B2 | * | 1/2009 | Selig .................. G01G 19/4142 177/211 |
| 9,157,821 | B2 | * | 10/2015 | Robert .................. G01L 9/0052 |
| 9,442,027 | B1 | | 9/2016 | Eilersen |
| 9,528,895 | B2 | * | 12/2016 | Robert .................. B81B 3/0021 |

FOREIGN PATENT DOCUMENTS

| | | | | |
|---|---|---|---|---|
| EP | 0534270 | * | 3/1993 | ............... G01G 3/12 |
| WO | 8801049 | A1 | 2/1988 | |
| WO | 2015188827 | A1 | 12/2015 | |

* cited by examiner

*Primary Examiner* — Octavia Hollington
(74) *Attorney, Agent, or Firm* — David Guerra

(57) ABSTRACT

A load cell comprising an elastic body having a base, a flexible membrane that is adapted to yield upon application of a load to the membrane, a sensor for measuring the load applied to the membrane, at least one connector having a first end that is connected to the membrane and a second end that is connected to the sensor. The connector is configured to transmit a mechanical force that is applied to the membrane to the sensor. The connector can be attached to the membrane and/or the sensor by way of at least one pivotal connection.

17 Claims, 13 Drawing Sheets

LOAD CELL COMPRISING AN ELASTIC BODY HAVING A BASE AND FLEXIBLE MEMBER

CROSS-REFERENCE TO RELATED APPLICATION

This application is a continuation application under 35 U.S.C. § 120 based upon co-pending International Application Serial No. PCT/DK2016/00046 filed on Dec. 1, 2016. Additionally, this continuation application claims the benefit of priority under 35 U.S.C. § 365(c) of International Application No. PCT/DK2016/00046 filed on Dec. 1, 2016, which claims the benefit of priority of Denmark Patent Application No. PA201500791 filed on Dec. 7, 2015. The entire disclosure of the prior application is incorporated herein by reference.

BACKGROUND OF THE INVENTION

Field of the Invention

A load cell comprising an elastic body having a base, a flexible membrane that is adapted to yield upon application of a load to the membrane, a sensor for measuring the load applied to the membrane, and a connector connecting the membrane to the sensor.

Description of the Prior Art

Numerous load cells of this type are well known and FIG. 1 shows as an example a capacitive load cell with an elastic body and sensor means to detect the deformation of the elastic body in response to the load to be measured.

Load cells of this prior art will however provide measurements with substantial errors when an eccentric load is applied to the elastic body because the sensor means are activated in an unsymmetrical way, which results in measurement errors because of nonlinearities inherent in all sensor means.

U.S. Pat. No. 4,825,967 discloses a weight detecting apparatus, which detects the weight of an object by detecting the change in electrostatic capacity due to a change in the distance between electrodes caused by deflection of flat plates, by using a pressure sensitive sensor having flat plates composed of two elastic insulators stuck together across a proper gap and extending parallel to one another.

While the above-described devices fulfill their respective, particular objectives and requirements, the aforementioned patents do not describe a load cell that allows for the transmitting of mechanical force applied to the membrane to the sensor. The above-identified patents make no provision for a connector pivotally connected to the membrane and/or the sensor.

Therefore, a need exists for a new and novel load cell that can be used for the transmitting of mechanical force applied to the membrane to the sensor. In this regard, the present invention substantially fulfills this need. In this respect, the load cell according to the present invention substantially departs from the conventional concepts and designs of the prior art, and in doing so provides an apparatus primarily developed for the purpose of for the transmitting of mechanical force applied to the membrane to the sensor.

BRIEF SUMMARY OF THE INVENTION

In view of the foregoing disadvantages inherent in the known types of load cells now present in the prior art, the present invention provides a novel load cell, and overcomes the above-mentioned disadvantages and drawbacks of the prior art. As such, the general purpose of the present invention, which will be described subsequently in greater detail, is to provide a new and novel load cell and method which has all the advantages of the prior art mentioned heretofore and many novel features that result in a load cell which is not anticipated, rendered obvious, suggested, or even implied by the prior art, either alone or in any combination thereof.

To attain this, the present invention essentially includes a load cell comprising an elastic body having a base, a flexible membrane having a configuration capable of yielding upon application of a load to said membrane, at least one sensor having a configuration capable of measuring the load applied to said membrane, and at least one connector having a first end that is connected to the membrane and a second end that is connected to the sensor. The connector can have a configuration capable of transmitting a mechanical force that is applied to the membrane to the sensor. The first end can be attached to the membrane and/or the second end being attached the sensor by way of at least one pivotal connection.

There has thus been outlined, rather broadly, features of the invention in order that the detailed description thereof that follows may be better understood and in order that the present contribution to the art may be better appreciated.

This means that a force that is applied to the membrane, causing the membrane to flex or deform, the deflection of the membrane may be transferred via the connector to the sensor. As the measurement is performed in a sensor, that is not in direct measurement relationship with the membrane, it allows the connector to filter out any movement of the membrane that is not parallel to the load which the load cell is adapted to measure, i.e. when an eccentric load is applied to the membrane and the flexure of the membrane is in more than one direction.

Within the meaning of the present invention, the term connected may mean that the connector is directly or indirectly connected to the membrane and/or the sensor. This means that the connector may be connected to a separate part of the load cell body that is connected to the sensor or the membrane.

Within the meaning of the present invention, a part of the flexible membrane is adapted to move relative to other parts of the load cell, where the difference in motion of the membrane is measured relative to other parts of the load cell. It may be envisioned that the load cell comprises more than one part that moves along with the membrane while more than one part of the load cell remain stationary during the movement of the membrane. I.e. a part of the membrane is adapted to move and/or flex relative to a stationary part of the load cell when a load is applied to the membrane.

In one embodiment the sensor may comprise a first sensor part that has a fixed first end that is fixed to the elastic body of the load cell and an free second end. Thus the first sensor part is adapted to have one of its ends connected to a stationary part of the load cell while the second end, which may be a free end, and/or an opposite end to the first end, may be adapted to move along with the movement of the membrane relative to the stationary part of the load cell.

In one embodiment the connector may be connected to the second end of the first sensor part, so that the movement of the membrane is transmitted to the second end of the first sensor part. Thus, by connecting the free end of the sensor to the membrane, it is possible to transfer or transmit the deflection and/or movement of the membrane due to the force applied to the membrane, to the free end of the first sensor part, so that the first sensor part will move in the intended direction the same distance or a relative distance to the membrane, i.e. a movement in the direction of the force applied to the membrane.

In one embodiment the sensor may comprise a second part, where the second part comprises capacitive measuring means. The second part of the sensor may be seen as a part of the sensor that allows the transmitted movement of the membrane to be measured using capacitive measuring. In one example the capacitive measuring may be in the form of a stationary part and a moveable part, where movement of the movable part is measured in relation to the stationary part, and the movement may be represented in a capacitive measurement. In one example, the first part of the sensor may be a beam, plate or other type of flexible material that is adapted to flex in response to the deflection and/or movement of the membrane, while the second part may be a stationary rigid beam that is capable of providing a capacitive measurement of the distance from the first part to the second part or vice versa.

In one embodiment the capacitive measuring means may comprise at least one electrode. Within the meaning of the present invention, the term electrode may be seen as a measuring electrode. In capacitive measurement the measurement may be made between a grounded part and a measurement electrode, where the capacitive measurement reflects the capacitance between the two elements. In one embodiment the sensor in accordance with the invention can include a plurality of electrodes and/or measurement electrodes and a plurality of grounded elements. Alternatively the term electrode can be seen as being a general description of capacitance measurement, where the grounded element may be seen as one electrode and the measurement electrode may be seen as a second electrode. Within the general meaning of the term electrode, the invention may be provided with at least one pair of electrodes for capacitance measurement.

In one embodiment the load cell may further comprises a capacitive measurement circuit.

The capacitance measurement circuit may be seen as the circuitry that may be utilized to provide the capacitance measurement between the grounded element and the measurement electrode, or between the pair of electrodes.

In one embodiment the sensor may comprise at least one electrode, where the electrode is fixedly connected to the elastic body of the load cell. By providing a sensor having at least one electrode, the electrode may be attached to the elastic body, allowing the electrode to be stationary, relative to the membrane or any part of the load cell that is intended to be moveable for measurement of a force.

In one embodiment the sensor may comprise a moveable part which is connected to the connector, and is adapted to move along with the membrane relative to other parts of the elastic body. The moveable part may be partly moveable and/or completely moveable, which means that when the membrane is deflected or moved, the moveable part may also move, especially when the membrane is deflected or deformed in the direction of the applied force. Thus, this part of the sensor may be utilized to measure the rate of deflection/deformation of the membrane, as it moves with the deformation, and this part of the sensor may be utilized to perform a measurement of the amount of movement to be transformed into an electrical signal that represents the force that is applied to the membrane.

In one embodiment the membrane may comprise a load introduction part or a load receiving part, which defines an area of the membrane where a load is intended to be applied to the load cell. This area of the membrane is the area where the load cell is best adapted to receive a force for accurate measurement. This area may be enhanced on the membrane, in order to ensure that the area will not be substantially deformed when a force is applied to the membrane. This enhancement may be an enforcement in the form of an area of greater thickness, or similar methods of strengthening the area.

In one embodiment the connector may be a rigid connector that can transfer compression and/or tension force from the membrane to the sensor. The connector may be in the form of a stiff rod or a stiff link, which means that the force/deformation which is transmitted through the membrane may be transferred onwards via the link to another part of the load cell and/or the sensor via tension forces and/or compression forces i.e. that the connector is of the kind that is capable of both pushing a second part and/or pulling a second part of the load cell or the sensor.

In one embodiment the connector may be flexible connector adapted to transfer tension force from the membrane to the sensor. The connector may be seen as a wire or a string that is capable of pulling onto a second part of the load cell or a sensor, while it is not capable of providing compression forces, i.e. that the connector will buckle, if compression forces are applied in the intended direction.

In one embodiment the load cell may comprises a side wall where the membrane is connected to one end of the side wall, and where the membrane adapted is moved relative to the side wall when a load is applied to the membrane. The side wall of the load cell may be an annular wall, where one end of the annular wall may be seen as a base end while the other end of the annular wall is attached to the periphery of the membrane.

The membrane may extend from one side wall to the opposing side wall, and may be uninterrupted the entire way, so that the membrane may be seen as closing a part of a volume that is defined by the annular side wall of the load cell.

In one embodiment the side wall may be substantially rigid. This means that the side wall may be utilized as a stationary part of the load cell, or provide a stationary base for the sensor of the load cell, so when the membrane is deflected, deformed or moved, the side wall does not substantially change its shape, position or form, and may be used as a basis point for measuring the movement of the membrane.

In one embodiment the connector may be connected to the membrane and/or the sensor via a pivotal connection. This means that the connector may pivot via the connection and change its angle relative to the plane or surface it is attached to during movement of the membrane. Thus, the pivotal connection ensures that the connector is securely fastened to at least one surface/area, and is allowed angular movement relative to the surface/area, while ensuring that when the deflection/movement is returned to its original position, the connector is returned to its original position.

In one embodiment the membrane may be positioned opposite to the base of the load cell. This means that the load cell may be positioned on a surface area, or a location, where the base of the load cell is positioned on that location, and the load may be applied to the opposite area of the load cell, where the membrane is positioned to receive the load.

It is the object of the invention to provide load cells with measurements, which are independent of eccentrically applied loads.

According to the invention, this object is achieved by providing a link, inserted between the elastic body and the sensor means.

This way and according to the invention the load to be measured may be measured by various types of sensor means activated by the link, which only transmit the deformation of the elastic body, which is in line with or parallel to the force to be measured.

A first embodiment of the load cell according to the invention comprises an elastic body with a membrane with a load introducing part and sensor means coupled to the membrane by a link with pivots each end.

A second embodiment of the load cell according to the invention comprises an elastic body with a membrane with a load introducing part and capacitive sensor means coupled to the membrane by a link with pivots each end.

A third embodiment of the load cell according to the invention comprises an elastic body with a membrane with a load introducing part and capacitive sensor means coupled with a lever action to the membrane by a link with pivots each end.

A fourth and a fifth embodiment of the load cell according to the invention comprises an elastic body with a membrane with a load introducing part and capacitive sensor means, with integrated electronic circuits, coupled to the membrane by a link with pivots each end.

The advantage gained by all embodiments is, that eccentric loads on the elastic body does only activate the sensor means with the deformation of the elastic body which is in line with or parallel to the force to be measured, while the deformations of the membrane, which due to eccentric loads, are not in line with or parallel to the force to be measured are absorbed by the link.

Numerous objects, features and advantages of the present invention will be readily apparent to those of ordinary skill in the art upon a reading of the following detailed description of the present invention, but nonetheless illustrative, embodiments of the present invention when taken in conjunction with the accompanying drawings.

As such, those skilled in the art will appreciate that the conception, upon which this disclosure is based, may readily be utilized as a basis for the designing of other structures, methods and systems for carrying out the several purposes of the present invention. It is, therefore, that the claims be regarded as including such equivalent constructions insofar as they do not depart from the spirit and scope of the present invention.

It is therefore an object of the present invention to provide a new and novel load cell that has all of the advantages of the prior art load cells and none of the disadvantages.

It is another object of the present invention to provide a new and novel load cell that may be easily and efficiently manufactured and marketed.

An even further object of the present invention is to provide a new and novel load cell that has a low cost of manufacture with regard to both materials and labor, and which accordingly is then susceptible of low prices of sale to the consuming public, thereby making such load cell economically available to the buying public.

Still another object of the present invention is to provide a new load cell that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
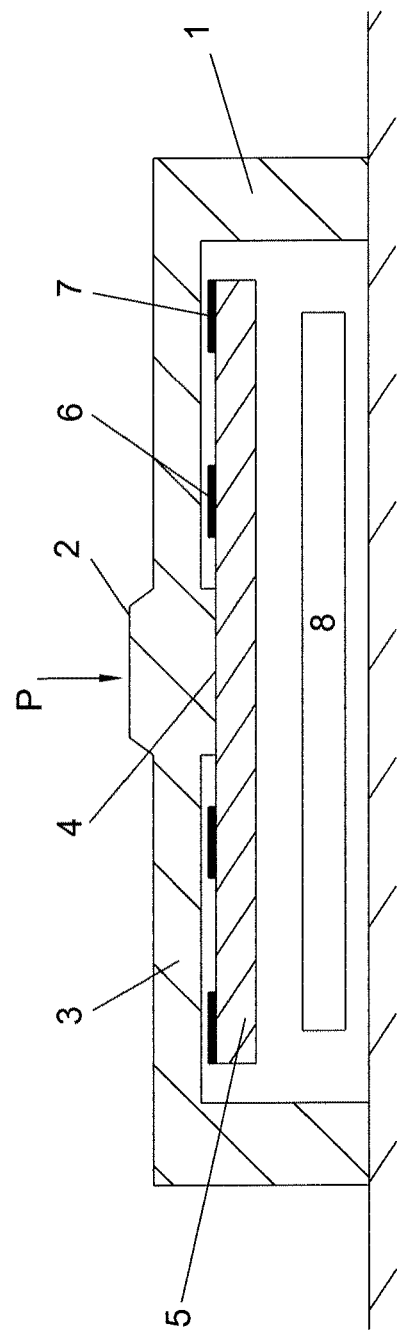
FIG. 1 shows, as prior art, a capacitive load cell with an elastic body and sensor means to detect the deformation of the elastic body in response to the load to be measured.

Referring now to the drawings, and particularly to FIGS. 1-16, embodiments of the load cell of the present invention are shown and described.

The sensor in FIG. 1 shows, as prior art, a load cell with an elastic body 1, with a load receiving part 2 in the membrane 3 which is the part of the elastic body 1, which is deformed by the load P to be measured, and capacitive sensor means mounted on the membrane 3 at the surface 4. The capacitive sensor means 5, provided with annular electrodes 6 and 7 and an electronic circuit module 8, for measuring the values of the capacitances of the electrodes 6 and 7 in response to the load to be measured.

Figure 2:
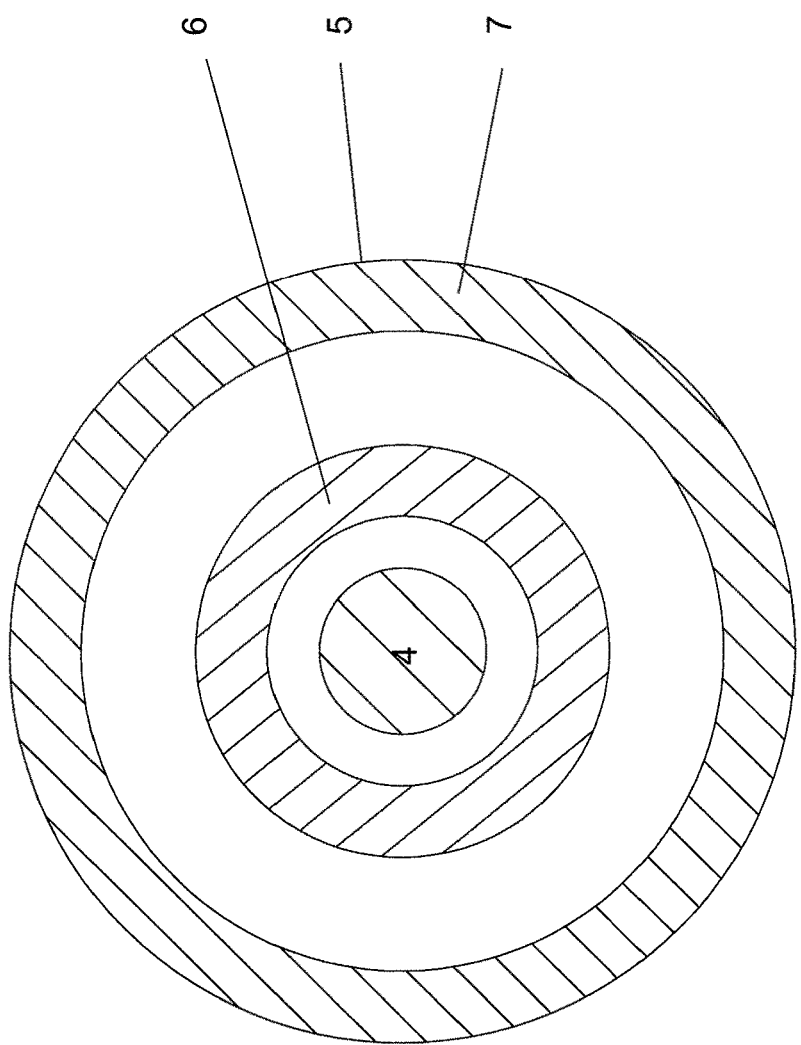
FIG. 2 shows capacitive sensor means for the load cell in FIG. 1.
Figure 3:
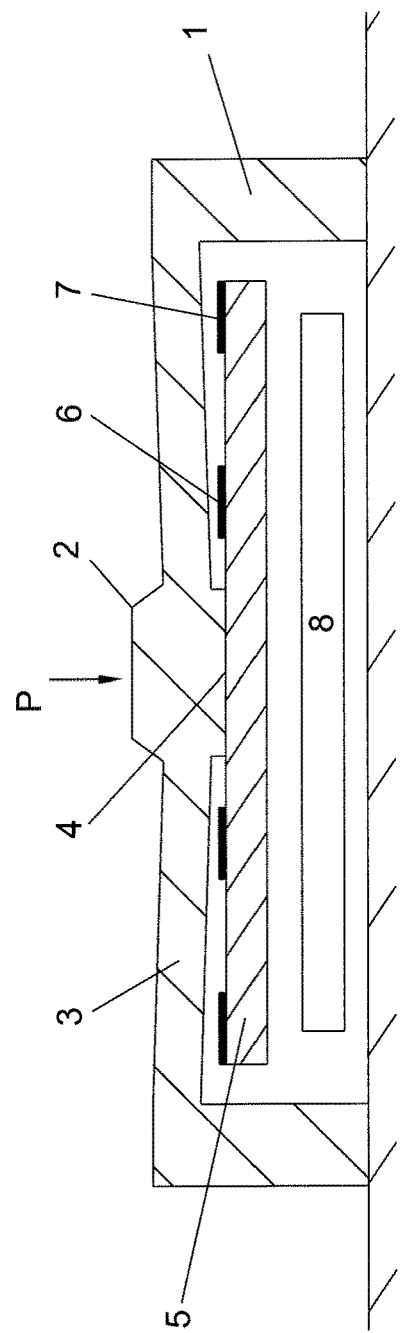
FIG. 3 shows, exaggerated, the deformation of the elastic body of the load cell in FIG. 1, in response to the load to be measured.

The capacitive sensor means 5, of FIG. 1 is shown in FIG. 2, with the mounting area 4 and the annular electrodes 6 and 7 which constitutes the measuring capacitances with the grounded inner surface of the membrane 3. In FIG. 3, the deformation of the membrane 3, due to the load P being applied to the load receiving part 2, is shown exaggerated for clarity. When the membrane is deformed, the distances between the electrodes 6 and 7 to the membrane 3 are changing according to the load P with the change of distance for electrode 7 being bigger than for electrode 6. If the electrodes 6 and 7 are connected to the capacitance measuring circuit 8, a signal representing the load P is obtained.

Figure 4:
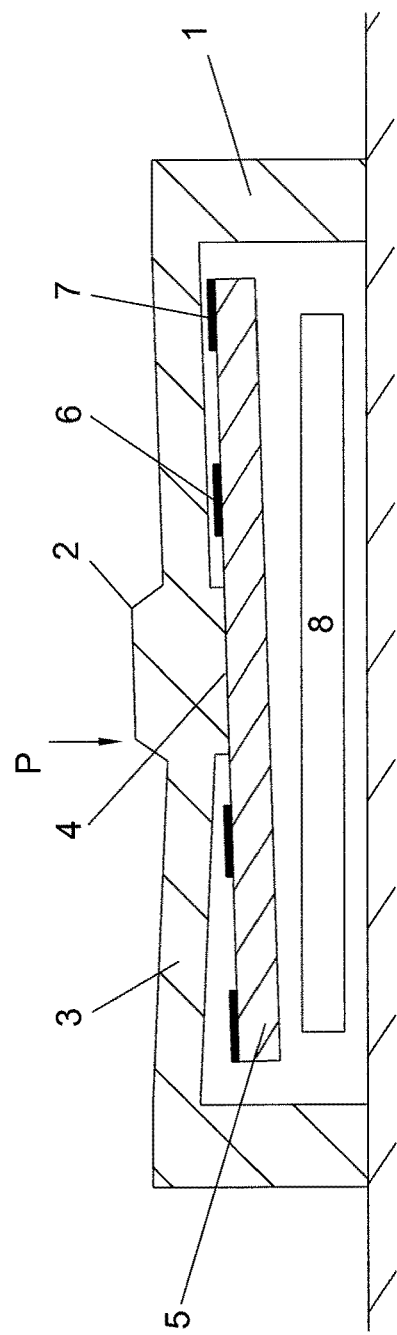
FIG. 4 shows, exaggerated, the deformation of the elastic body of the load cell in FIG. 1, in response to the load to be measured with the load applied eccentrically.

In FIG. 4, an eccentrically applied load P on the load receiving part 2 is deforming the membrane 3 in the direction of the load P, but at the same time tilting the load receiving part 2, resulting in a bigger change of distance between the electrodes 6 and 7 and the membrane, at the side where the eccentric load is applied, while the change of distance at the opposite side of the load receiving part is smaller. In FIG. 4, the change of distances is exaggerated for clarity. Capacitive sensors follow C=A/a, where C is capacitance, A is area of the electrodes 6 or 7 and a is distance, and the capacitance C is therefore a nonlinear function of the distance a, which again means that the decreasing and the increasing capacitance due to the bigger and the smaller changes of distance at the two sides due to the eccentric load does not cancel. An eccentrically applied load on the load cell according to prior art will therefore result in measurement errors.

The invention will now be described in further details with reference to FIG. 5, which is a basic embodiment of the invention with an elastic body 1, which is here comprising a membrane 3 with a load introduction part 2, a link 9 connecting the load receiving part 2 of the membrane 3 to the sensor means 12. The link 9 is here shown with pivots each end, but the link could essentially be formed as a flexible link, especially if the forces on the link are transformed into tension forces.

Figure 5:
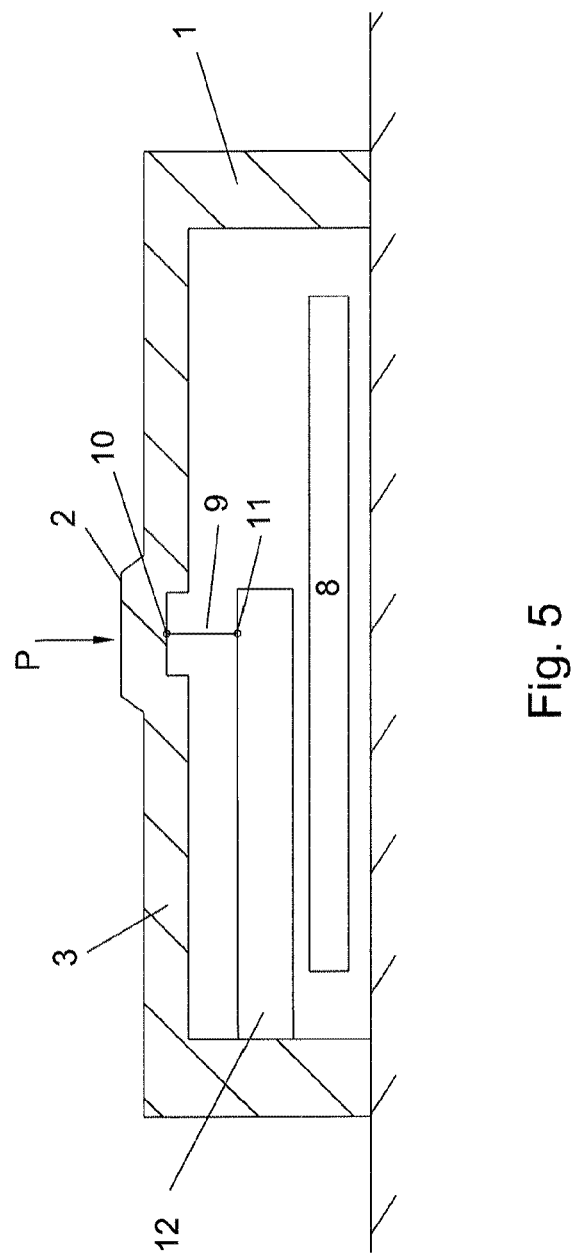
FIG. 5 shows a load cell according to the invention, where a link with pivots each end is inserted between the elastic body and the sensor means.

In FIG. 5, the link 9 is connected to the membrane 3 at or near the neutral level of the membrane in order to diminish the lateral movement of the upper end of the link 9 when the load is applied excentrically. The load cell of FIG. 5, will according to the invention be tolerant to eccentrically applied loads because only the deformation of the membrane 3 parallel to the applied load P will be transferred to the sensor means 8, while deformations of the membrane 3 in all other directions will be absorbed by the link 9.

Figure 6:
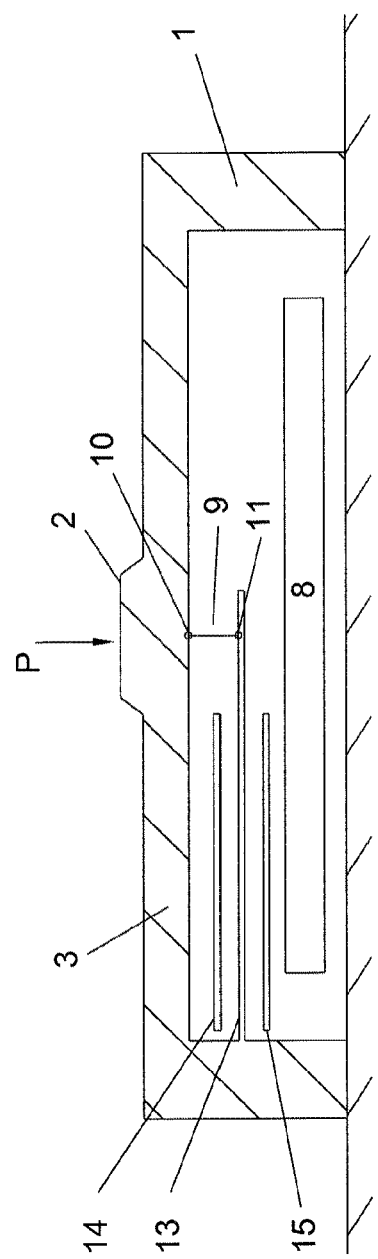
FIG. 6 shows a load cell according to the invention where a link with pivots each end is inserted between the elastic body and capacitive sensor means.

FIG. 6 is a load cell according to the invention with capacitive sensor means with the electrode 13 connected to the membrane 3 through the link 9, here with the pivots 10 and 11. The electrodes 14 and 15 form, with the (inner surface of the membrane), electrode 13, capacitances which are measured by the capacitance measuring circuit 8, which provide a signal which represent the load P.

Figure 7:
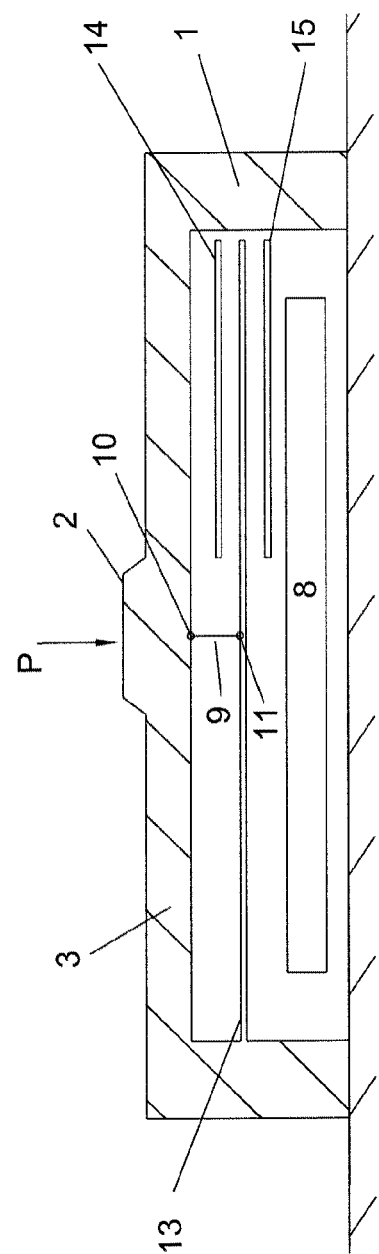
FIG. 7 shows a load cell according to the invention where a link with pivots each end is inserted between the elastic body and capacitive sensor means, where the link provides a lever action.
Figure 8:
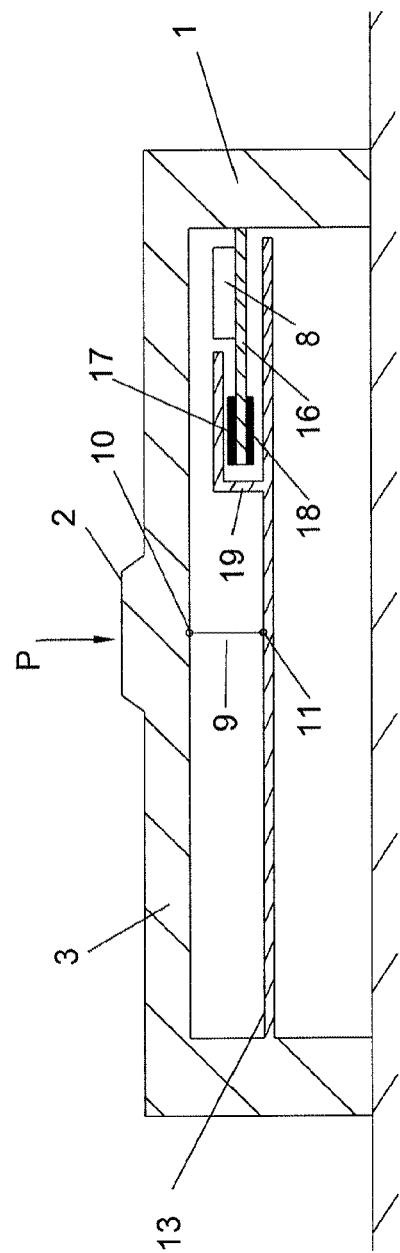
FIG. 8 shows a load cell according to the invention where a link with pivots each end is inserted between the elastic body and capacitive sensor means, where the electronic circuits are integrated with the capacitive sensor.

The load cell, in FIG. 7 has an advantage over the load cell in FIG. 6, in that a certain deformation of the membrane 3 in the direction of the load P, is amplified by the ratio of the total length of 13 divided by the length of 13, which lies between the anchoring point of 13 on the elastic body 1 and the point where the link 9 is fastened to 13. This lever action provides a bigger movement of the end of 13, and hereby a bigger change of the capacitances for a certain deformation of the membrane 3, compared with the load cell according to FIG. 6. The load cell according to FIG. 8, comprises an integrated capacitive sensor unit 16, which include the electrodes 17 and 18, which forms measuring capacitances with the grounded electrodes 13 and 19. The deformation of the membrane 3, is transferred to 13 and 19 through the link 9. The deformation of the membrane 3, as transferred by the link 9 to 13, will result in a decreased distance between electrode 17 and the grounded electrode 19, which results in a higher capacitance for the electrode 17, and vice versa for the electrode 18 and the grounded electrode 13. The capacitances are measured by the circuit 8.

The advantage obtained with this embodiment of a load cell according to the invention is the integration between the capacitance measuring circuit and the electrodes, preferably on a common printed circuit board or on a common thin- or thick film circuit for highest stability.

Figure 9:
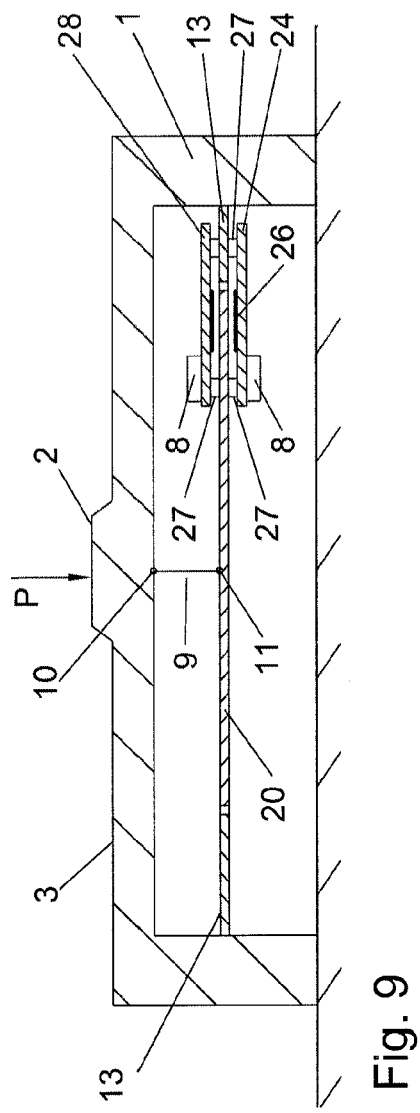
FIGS. 9-12 shows a load cell according to the invention where a link with pivots each end is inserted between the elastic body and capacitive sensor means, where most parts of the capacitive sensor means are integrated.
Figure 10:
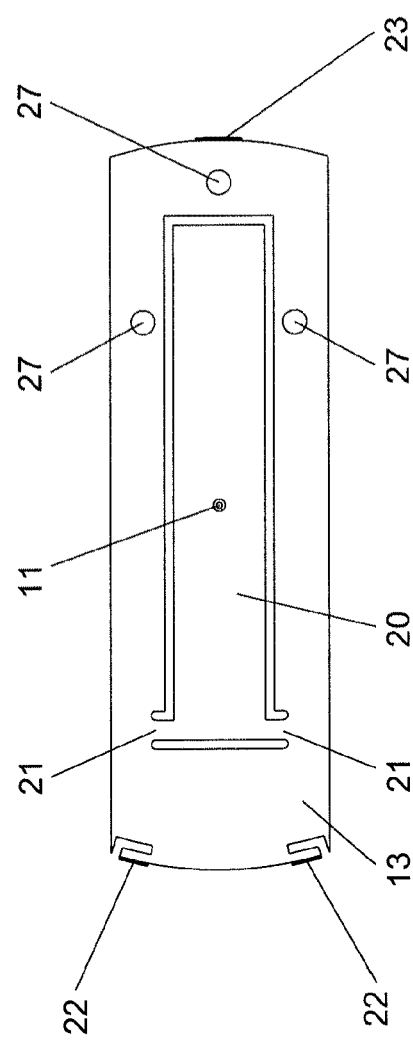

In the load cell of FIG. 9, the grounded electrode 13 is mounted in the elastic body 1, preferably laser welded to the elastic body 1 at the designated welding areas 22 and 23, where 22 provide a certain flexibility to absorb differences in the expansion of the elastic body 1 and the electrode 13. The electrode 20 is separated from the electrode 13, preferably by laser cutting, and the only connections between the grounded electrodes 13 and 20 are the flexible beams 21, which allows the free end of electrode 20 to move when the deformation of the membrane 3, in response to the load to be measured, is transferred by the link 9.

Figure 12:
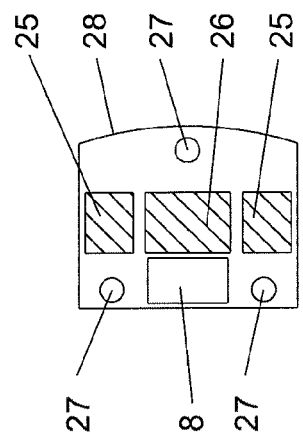
Figure 11:
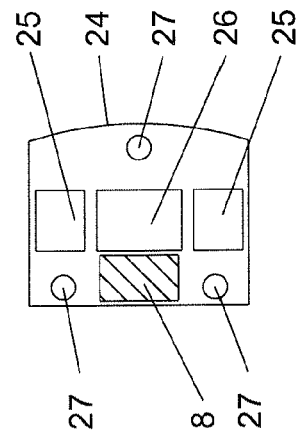

On the upper and the lower side of the grounded electrode 13 are mounted the electrode carriers 24 and 28, shown respectively in FIG. 11 and FIG. 12.

In embodiments of the load cell according to FIG. 9, one of the electrode carriers, 24 or 28 may be omitted.

The electrode carriers of FIG. 11 and FIG. 12 are preferably manufactured with the electrodes 25 and 26 and the capacitance measuring circuit 8, integrated on a common circuit board of printed circuit material or as a thin- or thick film circuit for highest stability.

The electrode carriers 24 and 28 are fastened on the electrode 13 by fasteners 27. The electrodes 26 have as their grounded counter electrode, the free end of the electrode 20. The electrodes 25 have as their grounded counter electrodes, the electrode 13. When the free end of electrode 20 move in response to the deformation of the membrane, as transferred by the link 9, the capacitances of the two electrodes 26 will change in a differential way, whereas the capacitances between the electrodes 25 and the grounded electrode 13 will theoretically be unchanged and act as references for the electrodes 26 to compensate for influences from a changing ambient temperature. This way, and according to the invention, a load cell is provided, which essentially is free from errors due to eccentric loads and changes of the ambient temperature.

Figure 13:
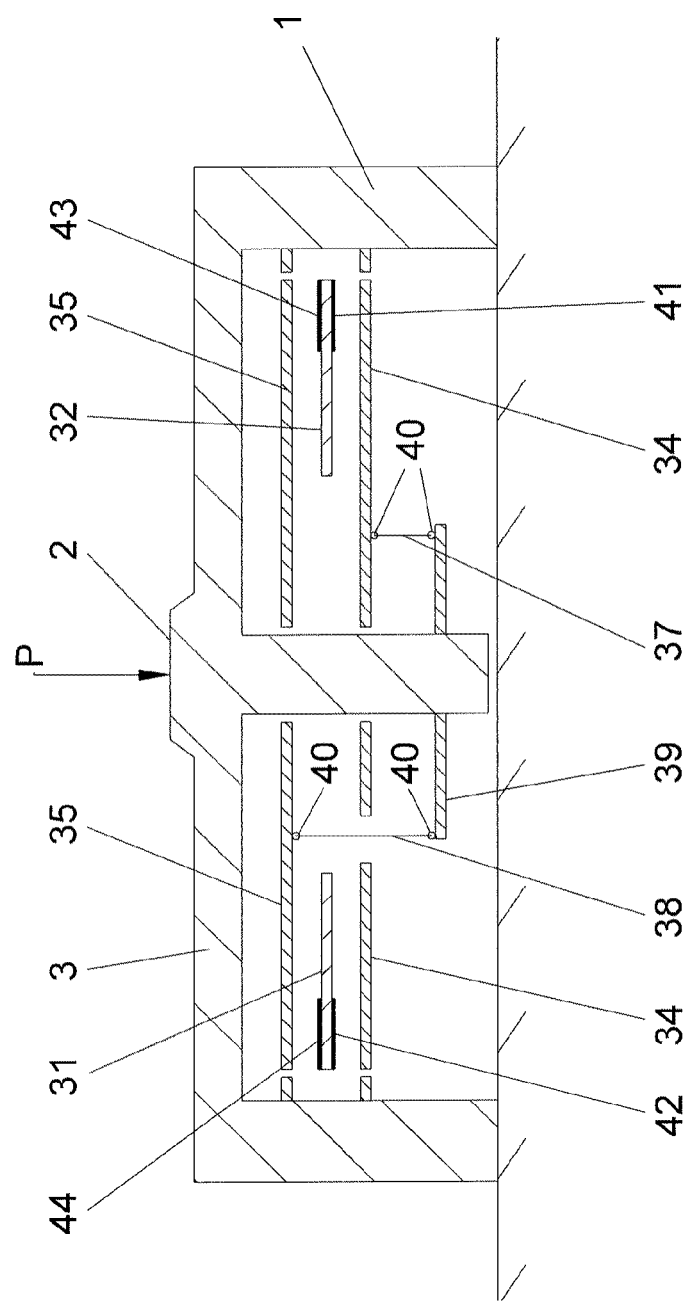
FIGS. 13-16 shows a load cell according to the invention where links with pivots each end are inserted between the elastic body and capacitive sensor means, which are arranged to provide differential capacitance changes.
Figure 14:
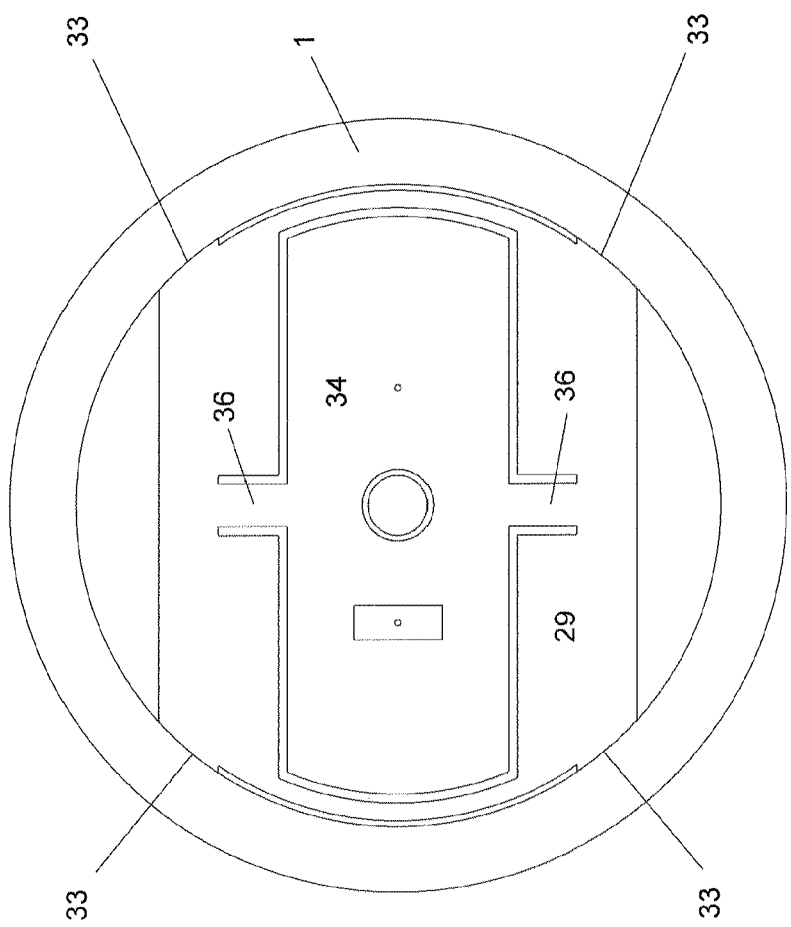
Figure 15:
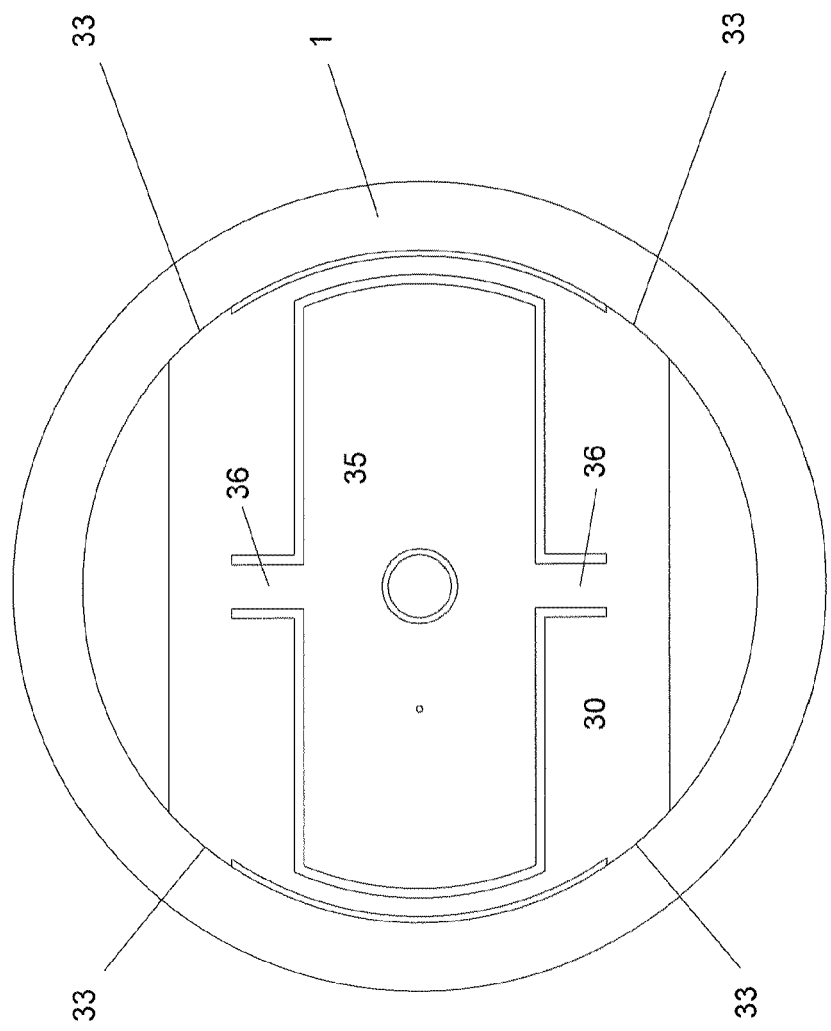
Figure 16:
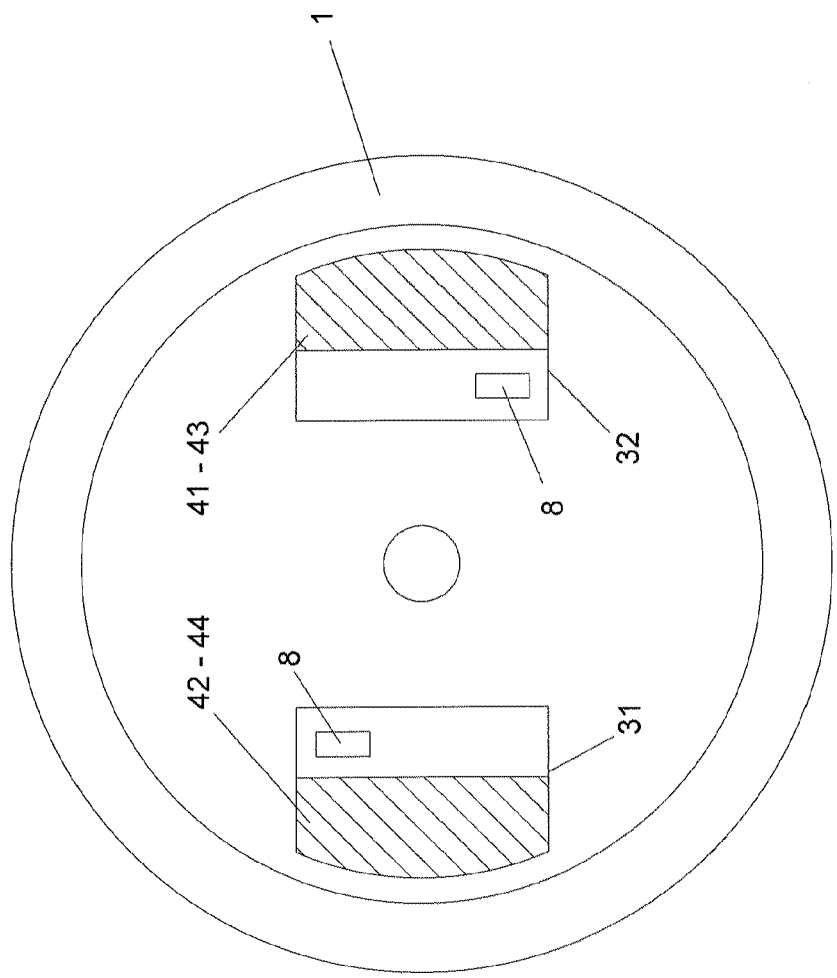

In the load cell of FIG. 13, the grounded electrodes 29 and 30, as shown respectively in FIG. 14 and FIG. 15, are mounted in the elastic body 1, preferably laser welded to the elastic body 1 at the designated welding areas 33, which provide a certain flexibility to absorb differences in the expansion of the elastic body 1 and the electrodes 29 and 30. The electrode carriers 31 and 32, are shown in FIG. 16 and are mounted between the electrodes 29 and 30. The moving parts 34 and 35 of respectively the electrodes 29 and 30 are separated from the electrodes 29 and 30, preferably by laser cutting, and the only connections between the grounded electrodes and the moving parts 34 and 35 are the flexible beams 36, which allows the free ends of the moving parts 34 and 35 to tilt when the deformation of the membrane 3, in response to the load to be measured is transferred by the link 37 to the moving part 34 of the grounded electrode 29 and by the link 38 to the moving part 35 of the grounded electrode 30, through the beam 39. The links 37 and 38 are preferably provided with pivots 40 each end. The electrode carriers 31 and 32 are preferably manufactured with electrodes on both sides with electrodes 41 and 42 facing the moving part 34 and the electrodes 43 and 44 facing the moving part 35.

Capacitance measuring circuits 8, are preferably integrated on the electrode carriers 31 and 32, which could consist of printed circuit board material or of a thin- or thick film circuit for highest stability.

When the right end of moving part 34 is deflected through the link 37 and the beam 39, by a downwards deformation of the membrane 3, it is seen that the capacitance of electrode 41, in FIG. 13 is decreased because of an increasing distance between electrode 41 and the right end of the moving part 34 of the grounded electrode 29. Likewise, the capacitance of electrode 42 is increased because of a decreasing distance between electrode 42 and the left end of the moving part 34 of the grounded electrode 29. When the left end of the moving part 35 is deflected through the beam 39 and the link 38 by a downwards deformation of the membrane 3, it is seen that the capacitance of electrode 44, in FIG. 13 is increased because of a decreasing distance between electrode 44 and the moving part 35 of the grounded electrode 30. Likewise the capacitance of electrode 43 is decreased because of an increasing distance between electrode 43 and the right end of the moving part 35 of the grounded electrode 30.

The advantage of this embodiment lies in the fact that both capacitances of electrodes 42 and 44 of electrode carrier 31 are increasing, which means that a possible movement of electrode carrier 31 relative to the grounded electrodes 29 and 30 to a high degree cancel out if the sum of the capacitances of electrodes 42 and 44 are used in the calculation of the signal.

Likewise both capacitances of electrodes 41 and 43 of electrode carrier 32 are decreasing, which means that a possible movement of electrode carrier 32 relative to the grounded electrodes 29 and 30 to a high degree cancel out if the sum of the capacitances of electrodes 41 and 43 are used in the calculation of the signal.

Embodiments

1. Load cell with an elastic body and sensor means, wherein the said sensor means are coupled to said elastic body through a flexible link.

2. Load cell with an elastic body and sensor means, wherein the said sensor means are coupled to said elastic body through a link with pivots at one or both ends.

3. Load cell with an elastic body and sensor means, wherein the said sensor means are capacitive and coupled to said elastic body through a link.

4. Load cell with an elastic body and sensor means, wherein the said sensor means are capacitive and coupled to a membrane of said elastic body through a link.

5. Load cell with an elastic body and sensor means, wherein the said sensor means are capacitive and coupled to a membrane of said elastic body through a link with one end of the link coupled to the neutral level of the membrane.

6. Load cell with an elastic body and sensor means, wherein the said sensor means are capacitive with differentially coupled capacitances and coupled to a membrane of said elastic body through a link.

7. Load cell with an elastic body and sensor means, wherein the said sensor means are capacitive and coupled to a membrane of said elastic body through a link, which is coupled to the sensor means, amplifying the deformation of the elastic body.

8. Load cell with an elastic body and sensor means, wherein the said sensor means are capacitive with integrated electrodes and measuring circuit and coupled to a membrane of said elastic body through a link.

While embodiments of the load cell have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used instead of the above-described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A load cell comprising
   an elastic body having a base;
   a flexible membrane having a configuration capable of yielding upon application of a load in a first direction to said membrane;
   at least one sensor having a configuration capable of measuring the load applied to said membrane;
   at least one connector having a longitudinal axis extending from a first end that is connected to said membrane and a second end that is connected to said sensor, where said connector has a configuration capable of transmitting a mechanical force that is applied to said membrane to said sensor; and
   at least one pivotal connection associated with at least one of said first end and said second end of said connector;
   wherein said longitudinal axis of said connector is arranged to be substantially parallel to said first direction of said load.

2. The load cell of claim 1, wherein said sensor includes a first sensor part that has a first end that is fixed to said elastic body of said load cell and a free second end.

3. The load cell of claim 2, wherein said connector is connected to said second end of said first sensor part, so that movement of said membrane is transmitted to said second end of said first sensor part.

4. The load cell of claim 1, wherein said sensor includes a second part, said second part includes a capacitive measuring device.

5. The load cell of claim 4, wherein said capacitive measuring device includes at least one electrode.

6. The load cell of claim 5, further comprises a capacitive measurement circuit.

7. The load cell of claim 1, wherein said sensor includes at least one electrode, said electrode is fixedly connected to said elastic body.

8. The load cell of claim 1, wherein said sensor includes a moveable part which is connected to said connector, and is adapted to move along with said membrane relative to other parts of said elastic body.

9. The load cell of claim 1, wherein said membrane includes a load introduction part or a load receiving part, which defines an area of said membrane where a load is capable of being applied to said load cell.

10. The load cell of claim 1, wherein said connector is a rigid connector having a configuration capable of transferring a compression force or a tension force from said membrane to said sensor.

11. The load cell of claim 1, wherein said connector is a flexible connector having a configuration capable of transferring a tension force from said membrane to said sensor.

12. The load cell of claim 1, further comprises a side wall where said membrane is connected to one end of said side wall, and where said membrane has a configuration capable of moving relative to said side wall when a load is applied to said membrane.

13. The load cell of claim 12, wherein said side wall is annular, with a peripheral area of said membrane attached to said side wall.

14. The load cell of claim 12, wherein said side wall is rigid.

15. The load cell of claim 1, wherein said membrane is positioned opposite to said base of said load cell.

16. The load cell of claim 1, wherein said first end of said connector is attached to said membrane by way of said pivotal connection, and said second end is attached to said sensor by way of a second pivotal connection.

17. The load cell of claim 1, wherein said pivotal connection is substantially parallel to and acting parallel to the load applied to said membrane.

* * * * *